Dec. 5, 1961 P. YOUNG 3,011,536
MEAT CARVING SUPPORT
Filed Feb. 19, 1959 2 Sheets-Sheet 1

INVENTOR
PAUL YOUNG
BY
ATTORNEY

Dec. 5, 1961   P. YOUNG   3,011,536
MEAT CARVING SUPPORT
Filed Feb. 19, 1959   2 Sheets-Sheet 2

INVENTOR
PAUL YOUNG
BY
ATTORNEY

United States Patent Office 3,011,536
Patented Dec. 5, 1961

3,011,536
MEAT CARVING SUPPORT
Paul Young, 5120 Linnean Terrace NW.,
Washington, D.C.
Filed Feb. 19, 1959, Ser. No. 794,451
3 Claims. (Cl. 146—216)

My invention relates to improvements in devices used for carving meat or other food articles. It is a special aim of my invention to provide a simple, sturdy device for effectively supporting large pieces of meat so that they can be safely and readily carved without marring the appearance of the meat. Further advantages of my invention will become apparent as the description thereof proceeds.

There has been a long-felt need for a simple device for neatly carving large pieces of meat, as roast of beef or the like. Such roasts are frequently quite large, indeed, those used in restaurants frequently weigh as much as 75 pounds. For most efficient carving, such a roast should preferably be supported in a vertical position. However, due to their typically oblong, rounded, irregular shape, effective support—vertical or otherwise—during the carving operation presents quite a problem. Many devices have been proposed having for their purpose to provide a proper support for the roast during carving but, to the best of my knowledge, none of these has proven entirely satisfactory. For the most part, such devices include a number of sharp prongs on which the meat is impaled to insure stable support during carving. However, it will be appreciated that piercing of the meat produces holes and tears in the meat which mar the attractive appearance of the cuts. Further, the positioning of the prongs in the body of the meat necessarily interferes with the ready slicing thereof.

My invention overcomes these several drawbacks. It permits the roast or the like to be supported in a stable position without producing tears in the meat, and enables ready carving of practically the entire roast without interference from the elements of the support.

My invention will be better understood from the following detailed description taken in conjunction with the annexed drawing, wherein—

Figure 1:
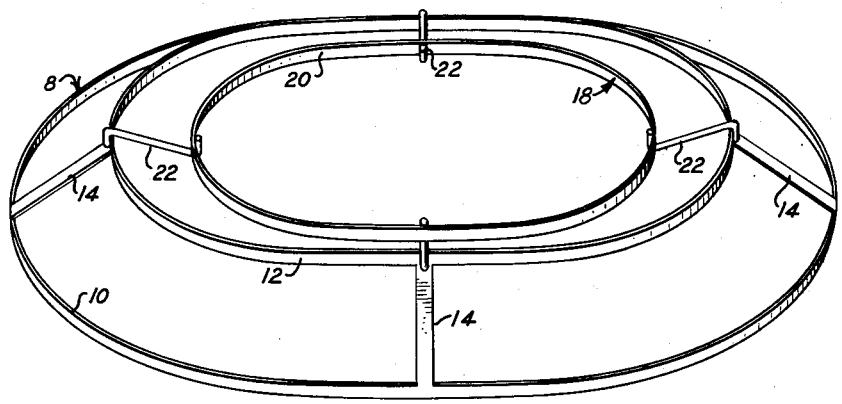
Figure 2:
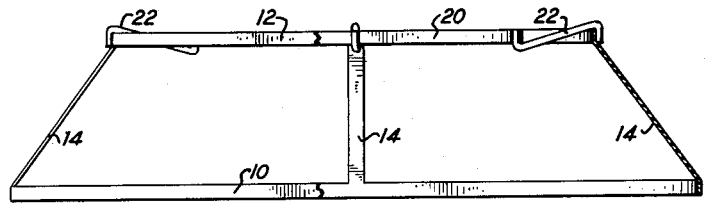
Figure 3:
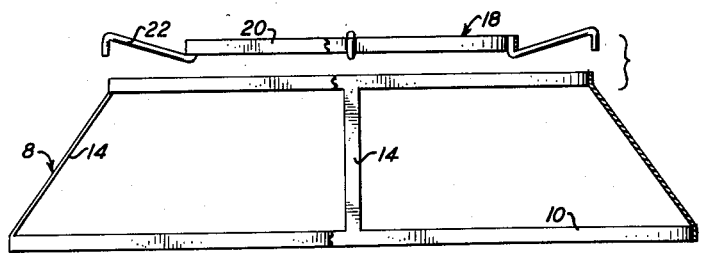
Figure 4:
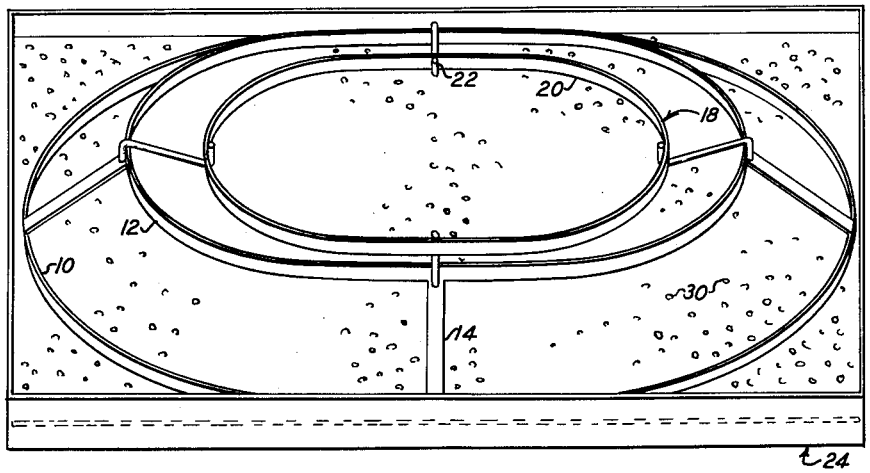
Figure 5:
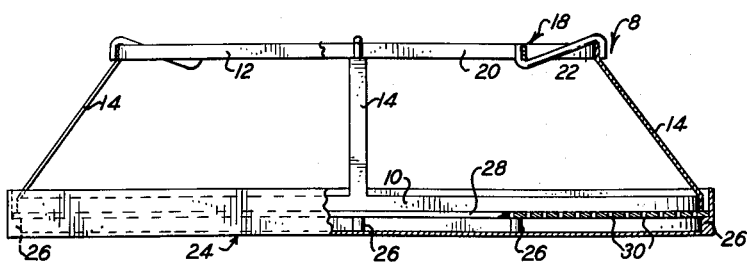
Figure 6:
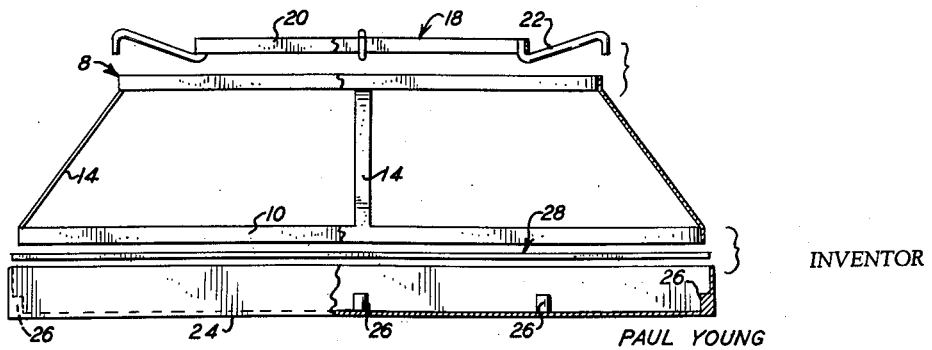

FIGURE 1 is a perspective view of the carving support, including an adapter unit;
FIGURE 2 is a front view of FIGURE 1, with certain parts in section;
FIGURE 3 is an exploded front view of FIGURE 1, with parts in section;
FIGURE 4 is a perspective view of a modified arrangement of my invention;
FIGURE 5 is a front view, partly in section, of the arrangement of FIGURE 4;
FIGURE 6 is an exploded front view, partly in section, of the arrangement of FIGURE 4.

Same or similar parts in the various figures are designated by the same reference numerals.

The meat-supporting unit of my invention, designated in its entirety by the numeral 8, comprises two closed, ring-like members 10, 12, generally oval in shape which are rigidly connected parallel to each other by a number of braces 14, 14. As will be observed, the member 10 is larger than member 12, and will hereafter be referred to as the base member. The members and braces can be of any suitable material such as aluminum, stainless steel, or the like. The annular members can have any suitable cross section, i.e. circular or rectangular. However, where the cross section is rectangular, the upper inside edge is rounded off to avoid presenting a sharp, cutting edge. The ring-like members can be cast integral or else can be readily formed by bending a metal bar into the required shape and uniting the ends by any suitable means, as welding, rivets, etc.

The device just described can serve effectively by itself as a carving support. To this end, the device is placed on a suitable surface, as a wooden cutting block, table, or the like, with the base member 10 resting on the surface. The roast is now inserted by its smaller end into the carving support, being permitted to rest on the upper member 12. The weight of the roast causes it to settle down firmly on the member 12, the roast being thereby firmly supported over its entire circumference by the member 12.

Actual experience with my device has shown that the meat is at all times stably supported, and that carving can be readily and neatly accomplished without interference from any projecting parts, since none are present above the plane of the upper, ring-like member 12. Further, since the upper inside corners of member 12 are rounded off, the surface of the meat in contact therewith is not cut into or marred in any fashion.

In order to be able to carve conveniently even the last portion of the roast and, in general, to permit my device to be used with small size roasts, I provide an adapter designated in its entirety by the numeral 18. The latter comprises a ring-like member 20, similar to the members 10 and 12, but smaller than the latter. Suitably attached to the member 20 is a series of hooks 22, by means of which the adapter can be suspended on and within the member 12.

When a large roast supported on member 12 has been carved down to a relatively small size, the roast is removed off member 12, the adapter 18 is suspended on member 12, and thereupon, the roast is replaced in position inside the member 20, being supported thereon. It will be apparent that, due to the generally sloping sides of the lower part of the roast, more meat will now be exposed above the plane of the members 12 and 20, so that the carving can again proceed conveniently.

Where the carving it carried out in the kitchen, the meat support according to my invention can, as mentioned above, be placed on any convenient table, wood cutting block, etc. Under certain circumstances, as when the roast is carved at the family table, or in front of patrons in a restaurant, it is desirable to provide a special tray for the carving support.

A suitable tray arrangement for this purpose is illustrated in FIGURES 4 to 6. It comprises, in addition to the carving support previously described, a tray proper 24 of any suitable material, as stainless steel, or aluminum, provided on the inside with a number of raised bearing blocks 26; the latter can be either permanently or removably attached to the tray. Resting on the top of the bearing blocks is a cover 28, provided with a number of openings 30. When using the tray, the carving support rests on the cover 28, the latter being of substantial thickness so that it is capable of supporting a heavy, large roast. Any juice dripping from the carved meat, etc. drains through the openings 30 into the tray 24.

The illustrated arrangement provides a neat and attractive assembly of devices for use in carving. It is apparent that in lieu of attaching the bearing blocks to the tray, they can likewise be mounted, either permanently or removably, on the bottom surface of the cover 28. Further, the bearing blocks 26 need not be attached to either the tray or cover. They can be loosely placed in the tray, and the weight of the cover, carving support and, of course the meat, will serve to keep the blocks in place. As will be appreciated, the use of loose bearing blocks will considerably facilitate cleaning of the tray.

As will be seen from the foregoing description, I have provided a construction which fully meets the object of the invention and which can be readily manufactured. It will be realized, however, that the specific embodiment shown and described for the purpose of illustrating the principles of this invention is susceptible of modification without departure from such principles. Therefore, this invention includes all embodiments encompassed within the spirit and scope of the appended claims. For example, my invention also comprehends the use of braces 14 which are attached to the ring members 10, 12 by rivets or the like, in lieu of being integrally formed therewith, as shown.

I claim:

1. A carving support for a roast of meat or the like comprising: a first generally oval, ring-like member of greater axial than radial dimension in radial section, said member being disposed horizontally for the support of a roast of meat thereon and having a smooth continuous upper edge portion; a second ring-like base member of substantially the same configuration but of greater radial dimensions than said first member and disposed in a plane therebelow; and a plurality of brace members rigidly connecting said ring-like members.

2. The structure defined in claim 1, including a ring-like adapter member of the same configuration as, but of smaller radial dimension than the first ring-like member, and a plurality of hook-like members secured to and extending generally radially outwardly of said adapter member for detachably engaging said first member to support said adapter member coaxially within and substantially in the same plane as said first member.

3. The structure defined in claim 1, including a tray of greater length than width and having imperforate bottom, side, and end walls; a perforated plate of a size to fit snugly within said tray and adapted to have the base member rest thereon; and means for removably supporting said plate within said tray in spaced relation above said bottom wall thereof, the dimensions of said tray being such as to snugly receive said base member.

References Cited in the file of this patent

UNITED STATES PATENTS

| | | |
|---|---|---|
| D. 138,395 | Howard | Aug. 1, 1944 |
| 1,316,365 | Jackson et al. | Sept. 16, 1919 |
| 2,377,415 | Guignon | June 5, 1945 |
| 2,467,337 | Schnell | Apr. 12, 1949 |
| 2,711,765 | Pecoraro | June 28, 1955 |
| 2,849,945 | Crowley | Sept. 2, 1958 |

FOREIGN PATENTS

| | | |
|---|---|---|
| 2,919 | Great Britain | 1874 |